United States Patent [19]

Smith et al.

[11] 4,267,760
[45] May 19, 1981

[54] SELF-GUIDING CIRCULAR SAW

[75] Inventors: Garth L. Smith; Gordon Whitehead, both of Granby, Canada

[73] Assignee: Wallace Murray Canada Limited, Granby, Canada

[21] Appl. No.: 83,234

[22] Filed: Oct. 10, 1979

[51] Int. Cl.³ .............................................. B23D 61/04
[52] U.S. Cl. ....................................... 83/835; 407/30
[58] Field of Search ................. 83/835, 837, 842, 854, 83/855; 407/30, 32, 55, 56, 60, 61

[56] References Cited

U.S. PATENT DOCUMENTS

| 877,146 | 1/1908 | Ward | 83/835 |
|---|---|---|---|
| 1,861,218 | 5/1932 | Huther | 83/835 |
| 2,694,423 | 11/1954 | Lawson | 83/842 |
| 3,344,822 | 10/1967 | Wilder | 83/837 |
| 3,730,038 | 5/1973 | Farb | 407/30 X |
| 4,123,958 | 11/1978 | Wright et al. | 83/837 |

Primary Examiner—Leonidas Vlachos
Attorney, Agent, or Firm—Swabey, Mitchell, Houle, Marcoux & Sher

[57] ABSTRACT

A self-guiding circular saw, the saw having a series of circumferentially spaced teeth around the periphery thereof. A pair of ribs protrude on opposite sides of the saw blade with each rib being co-extensive with the other and extending from the periphery of the blade linearly toward the central area of the blade. The combined thickness of the ribs and the blade being greater than the thickness of the blade but less than the kerf defined by the teeth of the saw such that the ribs will function to guide the saw in a straight path in the cut.

5 Claims, 4 Drawing Figures

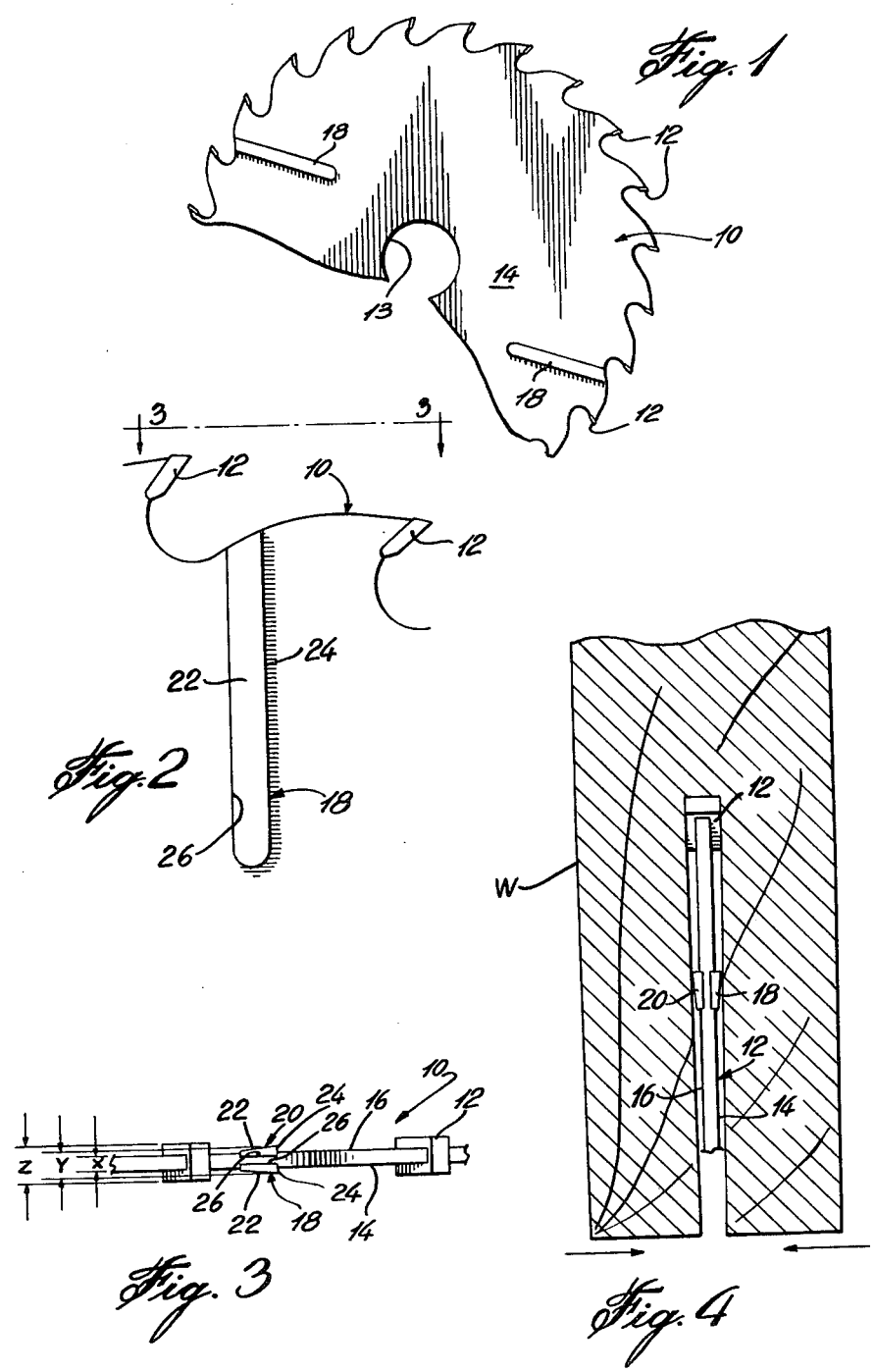

SELF-GUIDING CIRCULAR SAW

BACKGROUND OF THE INVENTION

1. Field of the Invention

The present invention relates to a circular saw blade, and more particularly to a saw blade for longitudinally sawing lumber.

2. Description of the Prior Art

A circular saw, when used for making longitudinal cuts in lumber, usually in the direction of the wood grain, must be guided to prevent the saw from making a distorted cut or from binding itself in the cut due to the cut being diverted. The saw can be diverted because it will tend to follow the grain in the wood which may not be exactly parallel to the longitudinal axis of the lumber piece. In the past, single edger saws could have machine mounted guide members for guiding the saw and keeping it true while a cut is being made.

However, with the increasing use of multi-saw canters and edgers, it is not possible to provide machine mounted guide members. Rather, it is necessary to develop a self-guiding saw blade.

U.S. Pat. No. 3,344,822, A. P. Wilder, inventor, illustrates a circular saw blade having peripheral teeth and linear planing elements secured to the surface of the saw blade and extending somewhat radially. The planing elements of the Wilder saw are of the same width or slightly wider than the kerf of the saw.

Canadian Pat. Nos. 873,127 and 964,557, both naming Keene S. Strobel as inventor and assigned to Weyerhaeuser Company, describe the well-known "Strobe" saw which comprises a circular saw having peripheral teeth and a plurality of slots extending inwardly from the periphery of the saw. The slots being faced on the cutting edge of the slot are faced with a cutting element having the width of the kerf of the saw teeth.

All of these prior art patents show the use of linear elongated elements provided in a generally radial direction on a circular saw blade with the combined width of these linear elements being substantially the width of the kerf of the saw. The linear elements are also provided with cutting edges for the purpose of planing the wood and removing the sawdust from the cut. The Strobe saws include the slots presumably to reduce heat built up in the saw and to clear away sawdust from the planing action of the linear members and is an improvement on Wilder.

It has now been discovered that the linear members on the saw blades also function as self-guiding members for the saws, thereby overcoming the problems described earlier with respect to cutting longitudinal lumber with circular saws. However, problems are encountered with the Wilder saw resulting from serious heat buildup in the plane of the blade due to the extended cutting edges. Thus, distortion results in the blade.

Strobel suggests placing slots ahead of Wilder's cutting elements to dissipate the heat but creates other problems as documented in U.S. Pat. No. 4,123,958, Wright et al, which alleges to be an improvement over the Strobel patents. The provision of slots in the plate of the blade actually weakens the blade. Wright et al breaks up the linear elements into shorter cutting elements interrupted by slots. However, the Wright et al saw would no longer have any inherent self-guiding properties.

SUMMARY OF THE INVENTION

It is an aim of the present invention to provide a self-guiding saw without the drawbacks of the above-mentioned saws.

It is a further aim of the present invention to provide an improved circular saw which is not slotted as the Strobe saws and thus can be of smaller gauge than an equivalent Strobe saw and will use less energy in operation.

A construction in accordance with the present invention comprises a circular saw having a series of circumferentially spaced teeth around the periphery thereof, the saw having two radial parallel planar surfaces, the teeth defining a predetermined kerf wider than the thickness of the saw blade defined by said planar surfaces, a pair of ribs protruding one on opposite surfaces of the saw blade and each rib being coextensive with the other and extending from the periphery of the blade linearly towards the central area of the blade, the combined thickness of the ribs and the blade being greater than the thickness of the blade but less than the kerf defined by the teeth of the saw such that the ribs will function to guide the saw in a straight path in a workpiece cut.

BRIEF DESCRIPTION OF THE DRAWINGS

Having thus generally described the nature of the invention, reference will now be made to the accompanying drawings, showing by way of illustration, a preferred embodiment thereof, and in which:

FIG. 1 is a fragmentary side elevation of a circular saw blade embodying the present invention;

FIG. 2 is an enlarged fragmentary view of the saw blade shown in FIG. 1, illustrating a detail thereof;

FIG. 3 is a radial view of a blade taken along line 3—3 of FIG. 2; and

FIG. 4 is a somewhat schematic view of the circular blade of the present invention as it is forming a cut in a wooden workpiece.

DESCRIPTION OF THE PREFERRED EMBODIMENTS

Referring to the drawings, there is shown a circular saw blade 10 having regularly spaced peripheral cutting teeth 12 extending about the periphery of the blade 10. At the center of the blade is an opening 13 adapted to be held on an arbor. Clamping hubs (not shown) would be used for holding the saw 10 on the arbor and would cover a portion of the central area of the blade 10.

The blade 10 is provided with parallel planar side surfaces 14 and 16. Side surface 14 is interrupted by a pair of ribs 18 located at diametrically opposite portions of the blade. Ribs 20 are on the opposite surface 16 and are coextensive with ribs 18. Each rib 18 and 20 is an insert seated in respective recesses 26 defined on surfaces 14 and 16 of the blade, and the inserts are brazed therein or a suitable epoxy glue may be used for securing the inserts forming the ribs 18 and 20 in the recesses 26. It is understood that other conventional ways of fastening the ribs 18 and 20 to the blade, such as by welding or riveting. Each insert 18, in the present instance, is made of cobalt steel.

In a typical blade, the diameter was 20 inches with a 6½ inch arbor bore 13, and 30 teeth were spaced about the periphery of the blade. The kerf of the blade (the thickness defined by the lateral edges of the cutting teeth 12 which determine the thickness of the cut being made in the lumber) in the present example was 0.187 inches. The thickness of the plate was 12 gauge or 0.109 inches. The combined thickness of the inserts 18, 20 and the remaining plate material between the recesses 26 is 0.166 inches which is, as indicated previously, greater than the thickness of the plate but of a thickness less than the kerf of the blade. The length of the insert 18 or 20 was, in the above example, $2\frac{3}{4}$ inches, while the width of the insert was 5/16 inch. Each insert 18 and 20 had a somewhat flat angled tapered but not sharpened surface 22 which is adapted to maintain a minimum but constant contact with the side walls of the wood in the slot or cut being made by the saw. The front edges 24 are not cutting edges, but are meant as sawdust clearing surfaces.

Stated in another way, if X is the thickness of the saw blade 10, Y the combined thickness of the inserts 18 and 20 with the remaining saw blade material therebetween, and Z is the kerf by the saw, then the following expression applies:

$$Z > Y > X.$$

As can be seen by the above description, the ribs 18 and 20 so formed are of a thickness or shaped such that they do not scrape or cut into the wood. In other words, as the saw blade cuts through the wood as shown in FIG. 4, there is always a slight compression of the walls of the wood inwardly towards the cut, and these surfaces of the wood will engage the rubbing surfaces 22 of the ribs 18 and 20. The ribs 18 and 20 are guided by the walls of the cut of the wood and in the light of their own rigidity maintain the saw blade and, therefore, the saw teeth in a true straight direction through the wood. As compared to to the Strobe saw and the saw described in the Wilder patent, it is evident that the present saw is not a planing saw and that the inserts are not utilized for cutting or planing the surfaces of the cut, but the inserts are structured such as to act as guides so as to keep the saw straight.

We claim:

1. A self-guiding circular saw comprising a series of circumferentially spaced teeth around the periphery thereof, the saw having two radial parallel planar surfaces, the teeth defining a predetermined kerf wider than the thickness of the saw blade defined by said planar surfaces, a pair of ribs protruding one on opposite surfaces of the saw blade and each rib being coextensive with the other and extending from the periphery of the blade linearly toward the central area of the blade, the combined thickness of the ribs and the blade being greater than the thickness of the blade but less than the kerf defined by the teeth of the saw such that the ribs will function to guide the saw in a straight path in a workpiece.

2. A self-guiding circular saw as defined in claim 1, wherein there are pairs of ribs diametrically opposite areas of the saw blade.

3. A self-guiding saw as defined in claim 1, wherein the ribs are formed as individual inserts fitted into recesses provided in the planar surfaces of the saw blade, and the material forming the inserts is harder than the material forming the saw blade.

4. A self-guiding saw as defined in claim 1, wherein the ribs so formed are made of separate inserts fitted into recesses provided in the planar surfaces of the blade with each insert being of material different from the material of the blade and the inserts being provided with non-cutting surfaces.

5. A self-guiding saw as defined in claim 1, wherein $Z - a = Y$, when Z is the thickness of the kerf defined by the teeth, Y is the combined thickness of the saw blade and ribs, and a is equal to 0.020 inches.

* * * * *